(12) United States Patent
Kanayama et al.

(10) Patent No.: US 7,331,386 B2
(45) Date of Patent: Feb. 19, 2008

(54) ANCHOR ARM FOR SEISMIC LOGGING TOOL

(75) Inventors: Kazumasa Kanayama, Hachioji (JP); Colin Wilson, Kawasaki (JP); William Underhill, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 271 days.

(21) Appl. No.: 11/017,312

(22) Filed: Dec. 20, 2004

(65) Prior Publication Data

US 2006/0131015 A1 Jun. 22, 2006

(51) Int. Cl.
*E21B 47/00* (2006.01)

(52) U.S. Cl. ............... 166/254.2; 166/206; 73/152.17; 367/25

(58) Field of Classification Search ............ 166/254.2, 166/301, 376, 382, 55.3, 178; 73/152.17; 367/25

See application file for complete search history.

(56) References Cited

U.S. PATENT DOCUMENTS

| | | | |
|---|---|---|---|
| 4,365,668 A | 12/1982 | Bright | |
| 4,616,703 A | 10/1986 | Laurent et al. | |
| 5,109,921 A | 5/1992 | Alacena | |
| 6,032,733 A | 3/2000 | Ludwig et al. | |
| 6,170,601 B1 | 1/2001 | Nakajima et al. | |
| 6,179,055 B1* | 1/2001 | Sallwasser et al. | 166/254.2 |
| 6,315,075 B1 | 11/2001 | Nakajima | |
| 6,858,094 B2 | 2/2005 | Qu et al. | |
| 2001/0023791 A1 | 9/2001 | Nakajima et al. | |
| 2002/0000320 A1 | 1/2002 | Gissler | |
| 2005/0263280 A1* | 12/2005 | Sellers et al. | 166/255.1 |

FOREIGN PATENT DOCUMENTS

EP 0 647 859 4/1995

* cited by examiner

*Primary Examiner*—David Bagnell
*Assistant Examiner*—Brad Harcourt
(74) *Attorney, Agent, or Firm*—Karan Singh; Jaime Castano; Dale Gaudier (57) ABSTRACT

A borehole seismic acquisition tool configured for release from a stuck position within a borehole having a tool body with at least one sensor package, an anchoring arm, and anchoring arm linkage adapted to connect the anchoring arm to the tool body. The anchoring arm linkage includes a weakpoint mechanism adapted to break in response to a minimum threshold amount of breaking force being applied upon the weakpoint mechanism. The anchoring arm includes a first end adapted for contacting a borehole wall surface and a second end pivotally attached to the anchoring arm linkage. The anchoring arm also includes a movable cam removably secured to the first end via a first connector pin. The cam being at least partially rotatable about the first connector pin and configured and arranged to rotate against the borehole wall by a pulling force at a top portion of the borehole seismic acquisition tool.

28 Claims, 11 Drawing Sheets

ANCHOR ARM FOR SEISMIC LOGGING TOOL

BACKGROUND OF THE INVENTION

Figure 1:
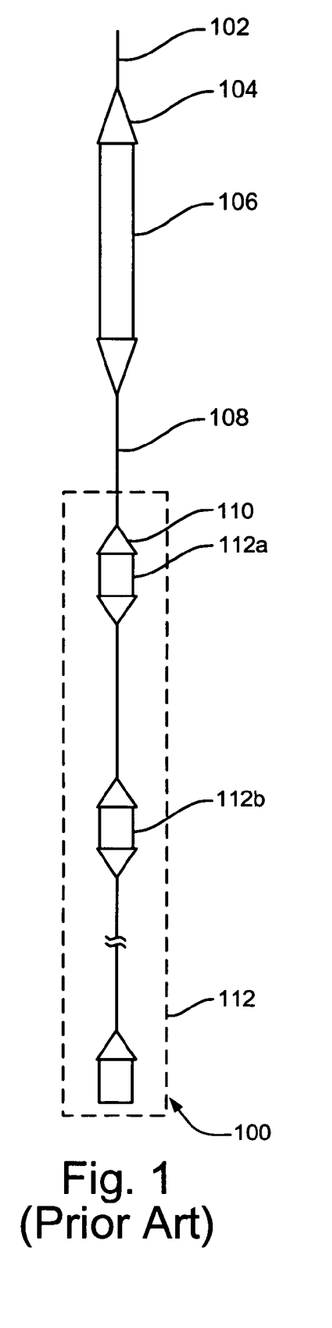
FIG. 1 shows an example of a multi-shuttle seismic array 100.

Seismic shuttle logging tools are generally known for use in performing vertical seismic profile (VSP) surveys from boreholes to evaluate the surrounding underground formations. An example of a multi-shuttle seismic array is illustrated in FIG. 1 of the drawings. As illustrated in FIG. 1, a multi-shuttle seismic array 100 may comprise a number of seismic logging tools linked together by means of a cable and logged through a borehole while seismic signals are generated at the surface. In the example of FIG. 1, the logging cable 102 (which may range in length, for example, from 4 to 46 km) connects to a logging head 104 which may include an Electrically Controlled Release Device (ECRD) and a Versatile Seismic Imager (VSI) cartridge 106. The multi-shuttle seismic array may also include a VSI interconnect cable 108, and a plurality of seismic logging shuttles 112 which may function as seismic receivers. At each measurement level, each shuttle is anchored to the wall of a borehole during a measurement operation by means of an anchoring arm. VSP survey techniques typically require multiple measurements to be taken at different levels or depths in a borehole. As a result, the tool anchoring mechanisms must be released to allow the tools to be repositioned. After the tools have been repositioned at the next measurement level, the tool anchoring mechanisms are then re-engaged before new measurements are performed.

Figure 2:
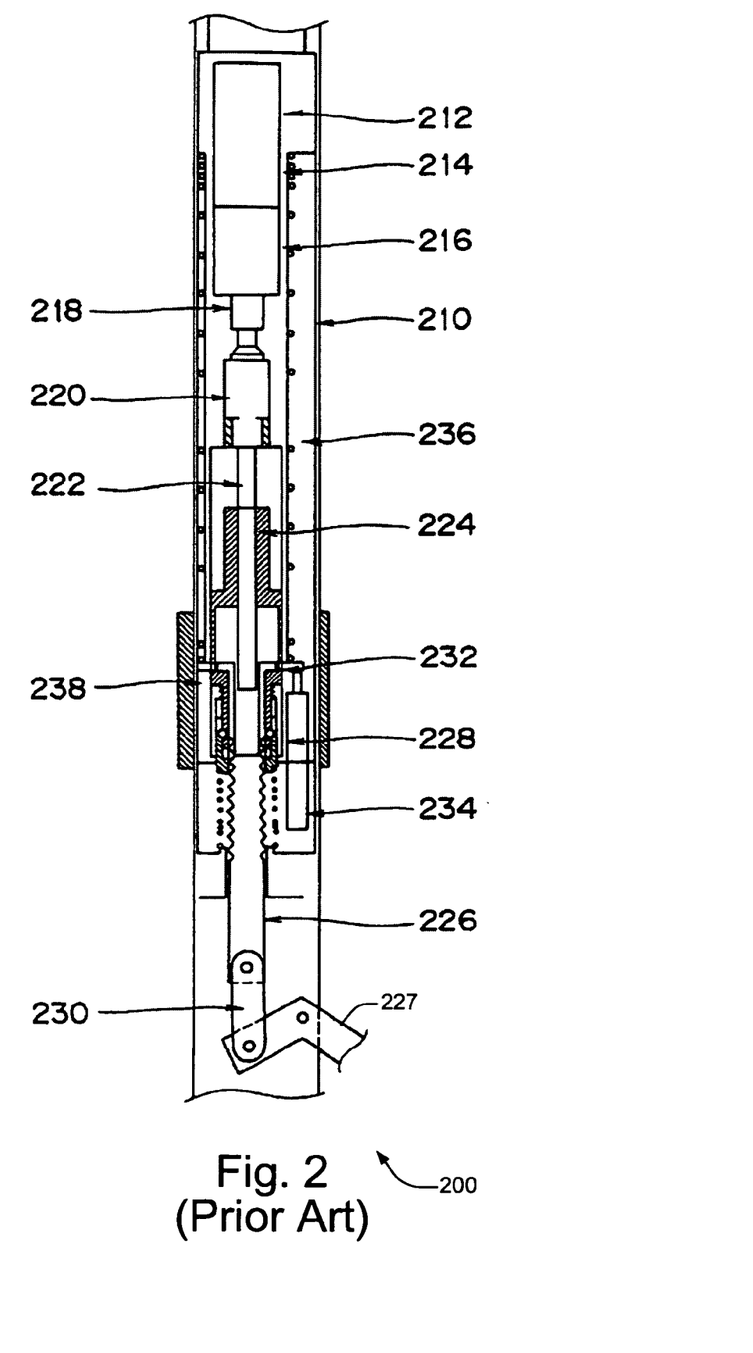
FIG. 2 shows a detailed view of a conventional anchoring mechanism 200.

FIG. 2 shows a detailed view of a conventional anchoring mechanism 200. The mechanism includes a permanent magnet (or electromagnet) brake 212, motor 214 and reducer arrangement 216 housed in the shuttle body 210. The output drive from the reducer 216 connects through a joint 218 and bearing 220 to a ball screw 222. The ball screw 222 drives a nut 224. The end of the screw 222 projects into the hollow end of a push rod 226 and the end of the nut 224 engages the outer surface of the push rod 226 through a clutch mechanism 228 which is described in more detail below. The end of the push rod 226 is connected to a link 230 through which it drives the anchoring arm of the shuttle (shown partially at 227).

The inner end of the push rod 226 is formed into a base section 232 which fits inside the nut 224. The base section 232 also has extensions outside the nut 224 to provide a connection to a potentiometer (or a linear variable differential transformer "LVDT") 234 which acts as position sensor for the push rod 226 and so can be used for a caliper measurement in the borehole using the anchoring arm. A compression spring 236 is located around the motor/ball screw mechanism inside the shuttle body and acts on the base section 232 so as to normally urge the push rod 226 and hence the arm, outwards. The extension of the push rod 226 under by the spring 236 is limited by the position of the nut 224 on the screw 222 such that operating the motor 214 to move the nut 224 causes the push rod 226 to move out due to the spring 236 or be pulled in by the action of the nut 224.

Extension of the push rod 226 by the spring 236 is limited by either the arm contacting the borehole wall or by the base section 232 reaching the stops 238 positioned in the body (fully extended). Once the arm contacts the borehole wall, the nut 224 moves over the push rod 226 to activate the clutch 228 such that the screw 222 and nut 224 drives the push rod 226 directly and forces it against the borehole wall to anchor the shuttle. To release the arm, the motor is reversed and the screw 222 retracts the nut 224, releasing the clutch 228. The arm is then only held against the borehole wall by the spring 236 and so can move in or out as the shuttle is dragged up to a different position in the well. It is not necessary to retract the arm completely. If it is desired to retract the arm completely, the reverse motor drive is continued and the nut 224 is retracted along the screw 222 until it contacts the base section 232 of the push rod 226 which it then pulls back against the action of the spring 236 to retract the push rod 226 and thus the anchor arm. When the arm is fully retracted, the motor stalls and this is detected to find the fully retracted/closed position of the arm. The output from the potentiometer 234 can also be used to detect the arm in its fully retracted position. A detailed description of conventional anchoring mechanisms such as that illustrated in FIG. 2 is described in U.S. Pat. No. 6,315,075 to Nakajima, incorporated herein by reference in its entirety for all purposes.

Recently, the size of borehole seismic arrays has been increasing to more than 40 shuttles (at costs exceeding US$1,000,000). As a result, there is growing concern about losing assets (e.g., multi-shuttle seismic arrays) in a borehole. More importantly, the loss of a potentially important hole section and the cost of rig time may be an even greater concern if a seismic array retrieval operation (commonly referred to as a "fishing operation") is ineffective.

For example, in one undesirable scenario, a multi-shuttle seismic array may become stuck in a borehole due to a failure in retracting the seismic shuttle anchoring arms. In order to handle such scenarios, a mechanical weakpoint is typically built into the anchoring arm linkage and designed to break under a certain pulling force. The breaking of the anchoring arm linkage allows the arm a few inches of travel so that the shuttle can be freed. However, this final, forceful freeing procedure may not be successful in cased holes where lack of friction does not allow sufficient force to be transferred to the anchor-arm weakpoints.

Accordingly, it will be appreciated that there exists a continual need to improve multi-shuttle seismic array designs in order to provide improved seismic logging capabilities, performance, and reliability.

SUMMARY OF THE INVENTION

Various aspects of the present invention are directed to an anchoring arm for use with a borehole seismic acquisition tool which includes a tool body. The anchoring arm includes a first end adapted for contacting a borehole wall surface. The first end includes a tip portion which defines a slot. The anchoring arm also includes a movable cam inserted into the slot and removably secured to the first end via a first connector pin inserted through an aperture in the cam. According to at least one implementation, the cam is at least partially rotatable about the first connector pin. In one embodiment, the cam is designed to rotate in a substantially elliptical motion about the first connector pin. In this way, the radius of the cam may increase as the cam is rotated about the first connector pin. Further, according to at least one embodiment, when the cam is placed in contact with the surface of a borehole wall, rotation of the cam against the borehole wall surface may cause a displacement of the first end of the anchoring arm away from the borehole wall surface, thereby causing a force to be exerted upon the first end of the anchoring arm.

An alternate embodiment of the present invention is directed to a borehole seismic acquisition tool. The tool includes a tool body having at least one sensor package, an anchoring arm, and anchoring arm linkage adapted to connect the anchoring arm to the tool body. The anchoring arm linkage includes a weakpoint mechanism adapted to break in response to a minimum threshold amount of breaking force being applied to the weakpoint mechanism. The anchoring arm includes a first end and a second end, the second end being pivotally attached to the anchoring arm linkage, and the first end being adapted for contacting a surface of the borehole wall. According to at least one implementation, the first end of the anchoring arm includes a tip portion which defines a slot. The anchoring arm also includes a movable cam inserted into the slot and removably secured to the first end via a first connector pin inserted through an aperture in the cam. According to at least one implementation, the cam is at least partially rotatable about the first connector pin. In one embodiment, the cam is designed to rotate in a substantially elliptical motion about the first connector pin. In this way, the radius of the cam may increase as the cam is rotated about the first connector pin. Further, according to at least one embodiment, when the cam is placed in contact with the surface of a borehole wall, rotation of the cam against the borehole wall surface may cause a displacement of the first end of the anchoring arm away from the borehole wall surface, thereby causing a force to be exerted upon the weakpoint mechanism. In at lest one embodiment, the force exerted upon the weakpoint mechanism may be at least equal to the minimum threshold amount of breaking force.

A different aspect of the present invention is directed to a method for releasing a borehole seismic acquisition tool from a stuck position within a borehole. The borehole seismic acquisition tool includes a tool body having at least one sensor package. The borehole seismic acquisition tool further includes an anchoring arm, and anchoring arm linkage adapted to connect the anchoring arm to the tool body. The anchoring arm linkage includes a weakpoint mechanism adapted to break in response to a minimum threshold amount of breaking force being applied upon the weakpoint mechanism. The anchoring arm includes a first end and a second end. The second end of the anchoring arm is pivotally attached to the anchoring arm linkage. The first end of the anchoring arm includes a tip portion which defines a slot. The anchoring arm also includes a movable cam inserted into the slot and removably secured to the first end via a first connector pin inserted through an aperture in the cam. According to at least one implementation, the cam is at least partially rotatable about the first connector pin. An exposed portion of the cam is engaged with the surface of borehole wall. When a failure of retraction of the anchoring arm is detected, the cam may be caused to rotate against the borehole wall surface in response. The rotation of the cam against the borehole wall surface causes a force to be exerted upon the weakpoint mechanism, which, in turn, causes the weakpoint mechanism to break. The breaking of the weakpoint mechanism results in a release of the borehole seismic acquisition tool from the stuck position. According to a specific embodiment, rotation of the cam against the borehole wall surface may be caused by a pulling force applied to a top portion of the borehole seismic acquisition tool.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

accordance with a specific embodiment of the present invention.

DETAILED DESCRIPTION OF THE PREFERRED EMBODIMENTS

The present invention describes different techniques which may be used to improve multi-shuttle seismic array designs in order to provide improved seismic logging capabilities, performance, and reliability. One aspect of the present invention is directed to an improved anchor arm for a seismic logging tool such as, for example, a VSI shuttle.

Figure 3:
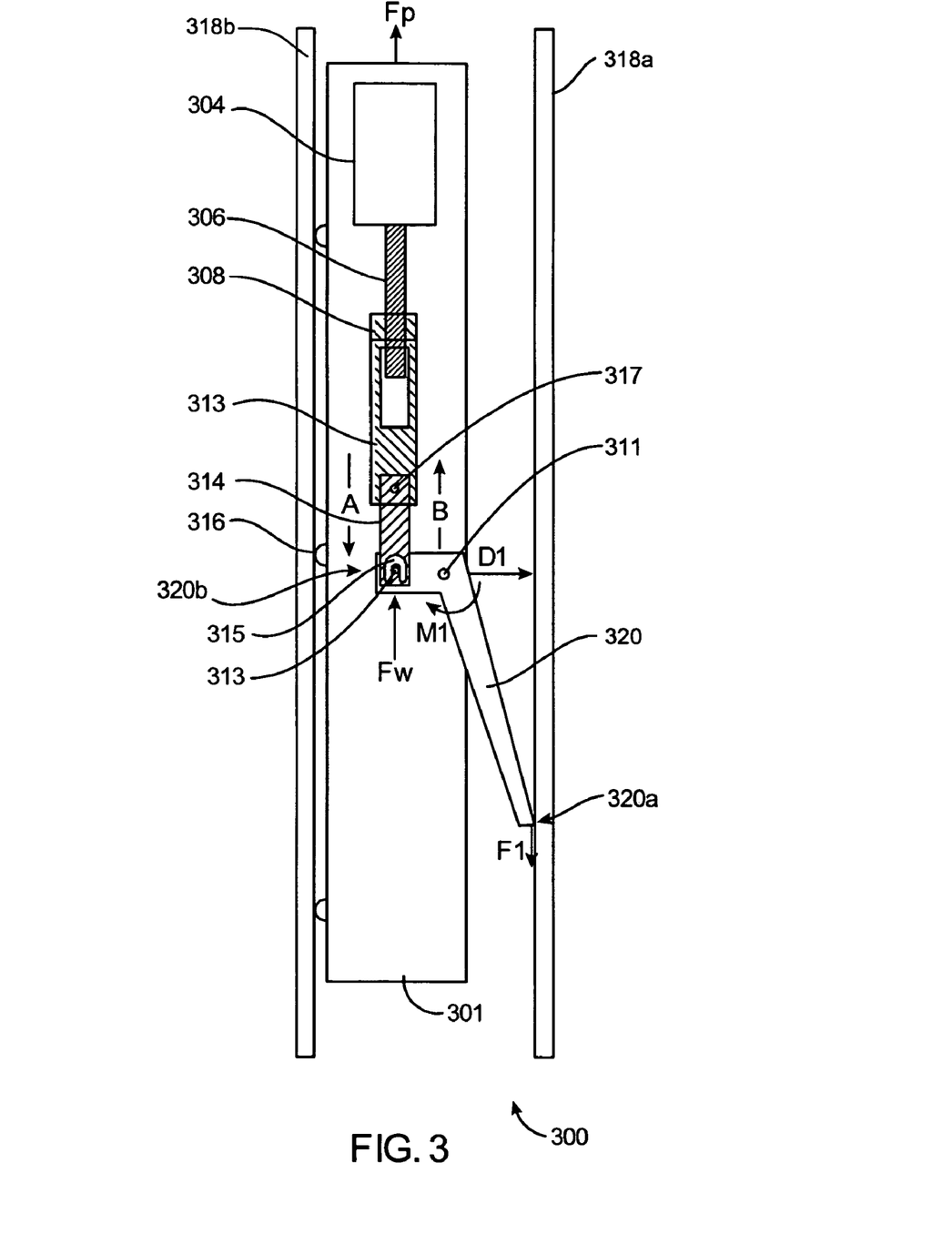
FIG. 3 shows a portion of VSI shuttle 300 which may be used for implementing various aspects of the present invention.

FIG. 3 shows a portion of VSI shuttle 300 which may be used for implementing various aspects of the present invention. In the example of FIG. 3, VSI shuttle portion 300 is shown to be anchored to a wall portion (318a, 318b) of a borehole using anchor arm 320. According to at least one embodiment, VSI shuttle portion 300 may be similar in design to the VSI shuttle 200 of FIG. 2. In the embodiment of FIG. 3, the anchoring mechanism for shuttle portion 300 includes gear drive motor 304, ball screw 306, ball nut 308, push rod 313, anchor arm linkage 314, pivoting anchor arm 320, standoff portions 316, etc.

It will be appreciated that situations may occur when one or more VSI shuttles of a multi-shuttle seismic array become stuck in a borehole due to failures in the shuttles' anchoring systems. In the event that an anchor arm cannot be closed properly, a pulling force may be exerted from the surface in an attempt to break an anchor arm weakpoint mechanism. In the embodiment of FIG. 3, the anchor arm weakpoint mechanism is incorporated into anchor arm linkage 314, which is described in greater detail in FIGS. 4A-C of the drawings.

Figure 4A:
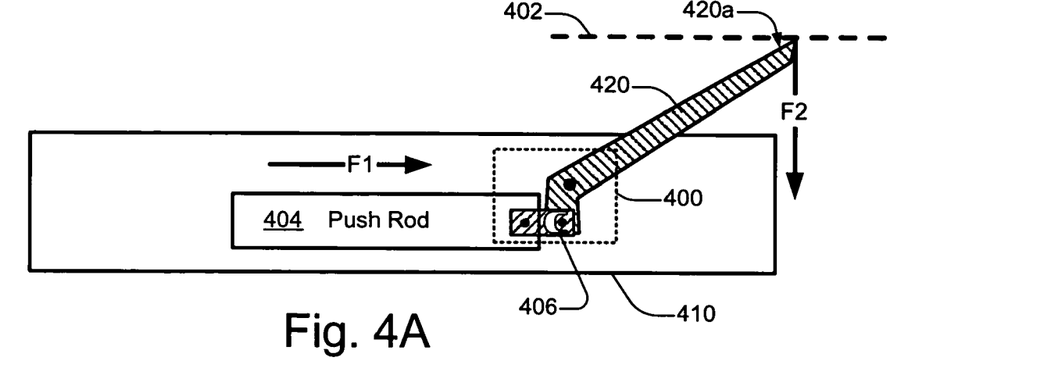
FIGS. 4A-C illustrate one technique for implementing an anchor arm weakpoint mechanism in a VSI shuttle.
Figure 4B:
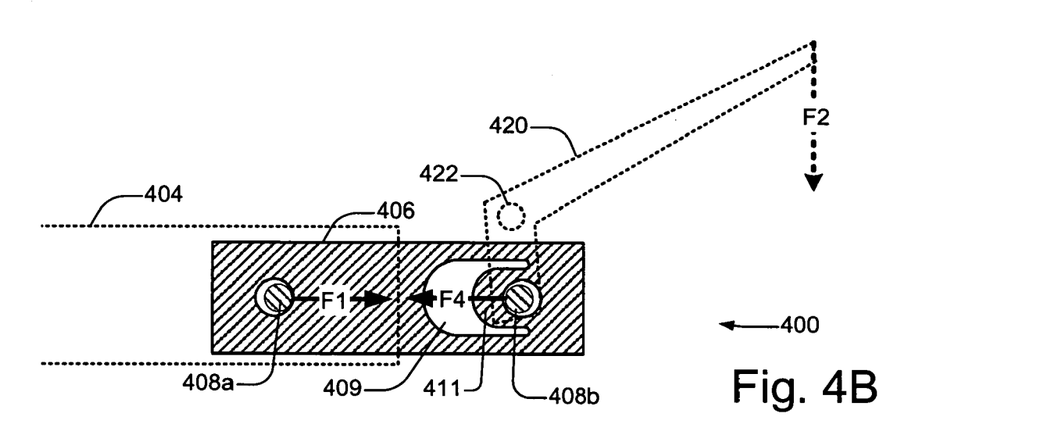
Figure 4C:
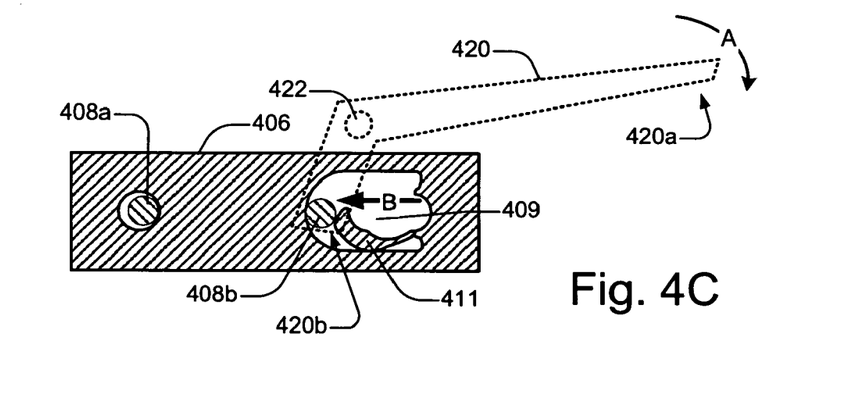

FIGS. 4A-C illustrate one technique for implementing an anchor arm weakpoint mechanism in a VSI shuttle. As illustrated in FIG. 4A, a force F1 is exerted upon push rod 404 to thereby engage anchor arm 420 against borehole wall portion 402. The anchor arm linkage 406 includes a weakpoint mechanism which is designed to break when a sufficient force F2 is exerted upon the end (420a) of the anchor arm which is in contact with the borehole wall. FIG. 4B shows a detailed view of linkage portion 400 of FIG. 4A. As shown in FIG. 4B, one end of link 406 is connected to push rod 404 via connector pin 408a, and the other end of link 406 is connected to anchor arm 420 via connector pin 408b. Weakpoints have been incorporated into the link body at or near connector pin 408b, resulting in a peninsula of link material 411 surrounded by a void or aperture 409. The anchor arm linkage weakpoint is illustrated in greater detail in FIG. 6A of the drawings.

Figure 6A:
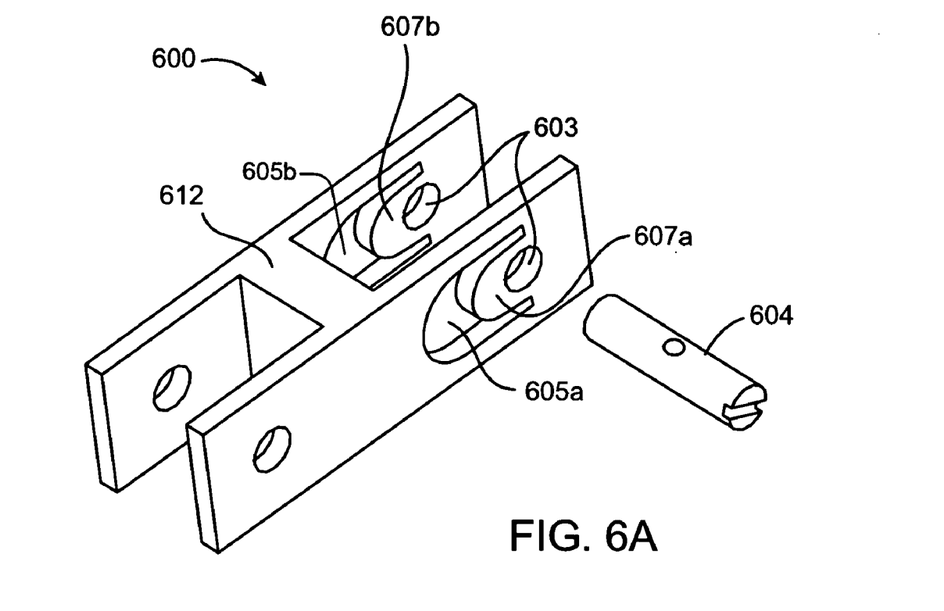
FIG. 6A shows a perspective view of the anchor arm linkage weakpoint mechanism of FIG. 4B.

FIG. 6A shows a perspective view of the anchor arm linkage weakpoint mechanism of FIG. 4B. As illustrated in FIG. 6A, the anchor arm linkage weakpoint mechanism 600 includes a link body portion 612 and at least one connector pin 604. For purposes of simplification, other components of the anchor arm linkage are not shown. Weakpoints have been incorporated into the link body portion by removing material as shown at locations 605a and 605b. As a result, the structural integrity of the link body material near connector pin apertures 603 have been weakened to allow a break to occur in this region with the application of a sufficient amount of force.

Thus, returning to FIG. 4B, when a sufficient amount of force F2 is exerted upon anchor arm 420, a force F4 is exerted upon connector pin 408b and link body portion 411. When the force F4 is sufficient (e.g., about 2000 kgf tensional force), the weekend portion 411 of the link body will break away, resulting in the diagram shown in FIG. 4C. As shown in FIG. 4C, the breaking of the region 411 of the link body allows the end portion (420b) of the anchor arm (which is connected to connector pin 408b) to move freely within cavity portion 409. As anchor arm end 420b moves in the direction indicated by arrow B, the other anchor arm end 420A moves in the direction indicated by arrow A. In this way, the breaking of the weakpoint mechanism provides the anchor arm with a few additional inches of travel. This additional range of motion of anchor arm 420 is intended to help release the VSI shuttle from a stuck position within the borehole.

Referring to FIG. 3, it will be appreciated that the transfer of force to the anchor arm linkage weakpoint may depend upon various factors including, for example, the frictional force (e.g., F1) being created at the contact between the anchor arm tip 320a and the borehole wall. Such frictional force creates rotational torque (M1) around the anchor arm pivot 311 and a counterforce (Fw) on the anchor arm linkage weakpoint mechanism. While this criterion may be relatively easily satisfied in open-hole conditions, a low-friction condition may exist inside of casing allowing the anchor arm to slip as it is pulled. For example, the wall surface inside of casing may be smooth and even lubricated by drilling fluid, causing the anchor arm to slip without creating sufficient force to break the weakpoint. In such cases, the anchor arm weakpoint may not break without some design consideration to facilitate frictional force and efficient force transfer to the weakpoint. According to at least one implementation, a special arm tip design mechanism may be employed to facilitate the gathering of frictional force, and to give a mechanical advantage to break the weakpoint. This as illustrated, for example, in FIGS. 5A-D of the drawings.

FIGS. 5A-F illustrate different views of a modified anchor arm in accordance with a specific embodiment of the present invention.

Figure 5A:
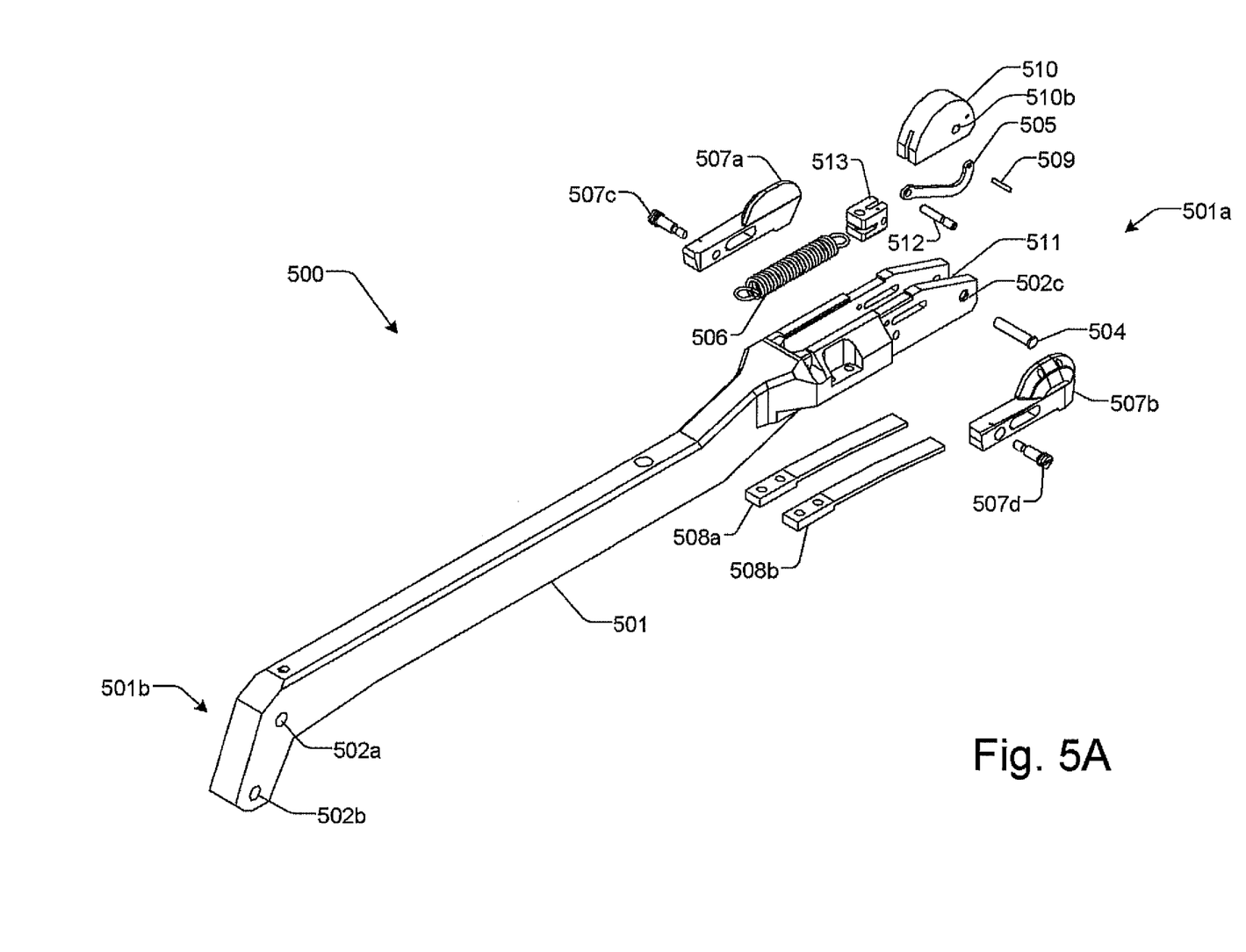
FIGS. 5A-F illustrate different views of a modified anchor arm in accordance with a specific embodiment of the present invention.

FIG. 5A shows an exploded view of a modified anchor arm 500 in accordance with a specific embodiment of the present invention. The anchor arm 500 includes a body portion 501 having two ends, namely 501a and 501b. One end 501b is designed to attach to the anchor arm linkage (not shown) of a seismic logging tool such as, for example, a VSI shuttle. The other end 501a of the anchor arm is designed for contact with the borehole wall, which may or may not include an inner casing. As illustrated in FIG. 5A, the end portion 501a of the anchor arm includes a slot 511 for receiving a removable cam 510. According to one implementation, the cam 510 may be movably attached to the anchor arm body 501 by inserting cam 510 into slot 511 and securing using locking pin 504, for example, by aligning apertures 502 c and 510b and inserting locking pin 504 into the apertures.

In the embodiment of FIG. 5A, cam 510 has been designed to have a substantially elliptical rotation. According to at least one embodiment, the modified anchor arm 500 may be designed such that, during normal seismic logging operations, cam 510 prevented from rotating until a pulling force (e.g., from the surface) creates enough initial tangential force to start an outward rotation of the cam. In this way, the cam mechanism is able to intensify friction at the borehole wall (which may or may not include an inner casing) as it rotates outward. Moreover, the rotation of the cam further enhances the grip on the borehole wall since an increasing inward force is created that works against the anchoring force, thereby ensuring that the cam mechanism rotates further outward without slipping. Rotation of the cam 510 also directly increases mechanical stress at the anchor arm linkage weakpoint since displacement of the anchor arm away from the borehole wall increases as the cam continues its elliptical rotation. Eventually, the displacement of the anchor arm will be sufficient to cause a break in the anchor arm linkage weakpoint.

Figure 5B:
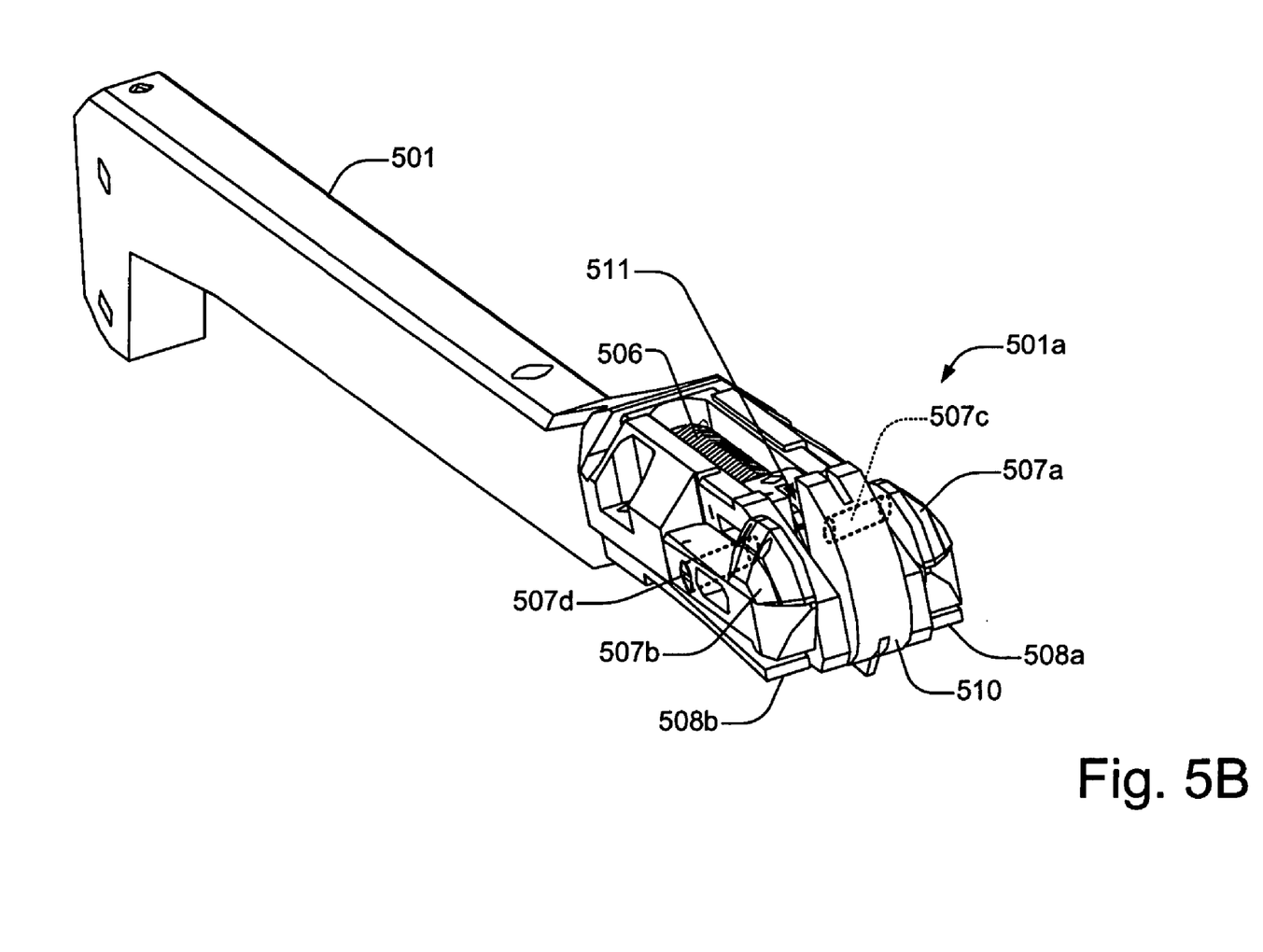

FIGS. 5B-F show different a perspective views of the end portion 501a of the modified anchor arm 500 in accordance with a specific embodiment of the present invention. As illustrated in FIG. 5B, the cam 510 is movably secured within the slot 511 using locking pin 504. According to at least one embodiment, the cam 510 may rotate within the slot 511 about the axis of locking pin 504. As explained in greater detail below, rotation of the cam 510 may occur, for example, in situations where a frictional force is created at the contact point between cam 510 and a borehole wall in an attempt to break the anchor arm linkage weakpoint.

Figure 5C:
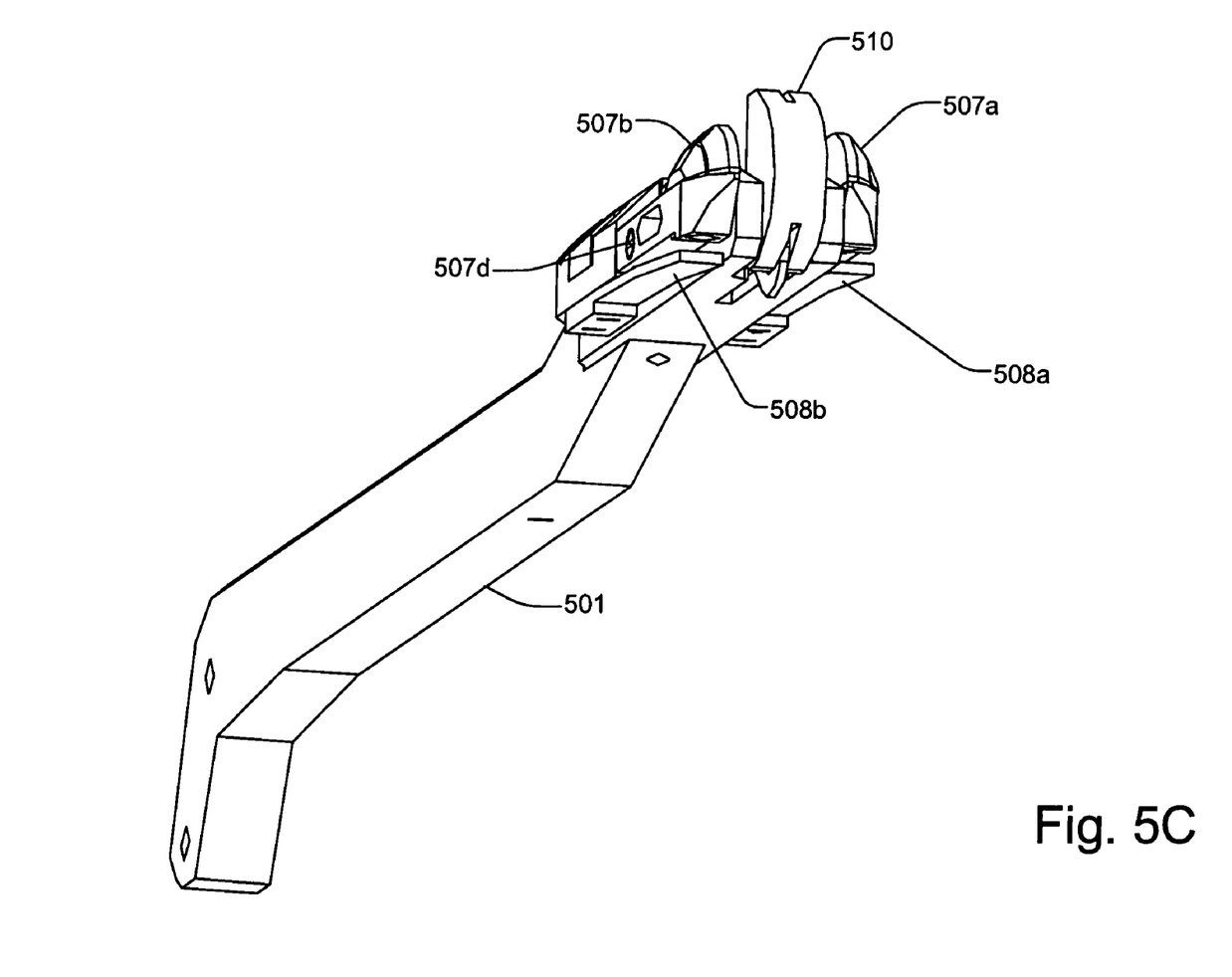

According to at least one implementation, the modified anchor arm of the present invention may include a cam protector mechanism, such as that illustrated, for example, in FIGS. 5B and 5C of the drawings. As illustrated in the embodiments of FIGS. 5B and 5C, the cam protector mechanism includes cam protectors 507a and 507b which may be pivotally attached to anchor arm 501 via connector pins (e.g., 507c, 507d). According to a specific implementation, the protectors 507a and 507b provide protection for the cam 510, for example, in order to reduce wear of the cam surface during normal seismic logging operations. In the examples of FIGS. 5B and 5C, a separate cam protector is located on each side of the cam 510. However, in alternate embodiments (not shown), a single cam protector may be used.

As illustrated in the embodiments of FIGS. 5B and 5C, the modified anchor arm may also include board springs 508a, 508b which are used to exert a spring force on cam protectors 507a, 507b in order to control movement of the cam protectors 507a, 507b. It will be appreciated that the board springs 508a, 508b depicted in FIGS. 5B and 5C have been exaggerated in order to show details of the board springs 508a, 508b and cam protectors 507a, 507b. In a preferred implementation, 508a, 508b may be configured or designed to maintain contact with cam covers 507a, 507b, as illustrated, for example, in FIG. 5D.

According to a specific embodiment, board springs 508a, 508b may each exert a spring force on a respective cam cover 508a, 507b. In one implementation, the spring force of board springs 508a, 508b is greater than the opening force of the anchor arm, but is weaker than the actuation force or anchoring force (e.g., the force needed to anchor a VSI shuttle against the borehole wall). According to a specific implementation, the modified anchor arm components are designed to allow the cam protectors to make contact with the borehole wall during dragging-up operations (e.g., when the multi-shuttle array is repositioned within the borehole). In this situation, the cam protectors prevent the cam from touching or engaging with the borehole wall. However, when an anchoring force is applied to the modified anchor arm (e.g., when the modified anchor arm is engaged to anchor the VSI shuttle against the borehole wall), the anchoring force will overcome the spring force of the board springs 508*a*, 508*b*, resulting in movement of the cam protectors 507*a*, 507*b* towards board springs 508*a*, 508*b*. The movement of the cam protectors causes the cam 510 to become exposed and make contact with the borehole wall.

According to a specific implementation, the surface of the cam protectors may coated with hard material such as, for example, tungsten carbide. The coating can preferably be chosen additionally to provide a substantially high level of friction with the borehole wall. Suitable examples include sprayed-on tungsten carbide having relatively large particle size. Particle sizes comparable to that found on 50 grit sandpaper has been found to be suitable for some applications, although smaller particle sizes, such as found on 80 grit sandpaper may be useful under some circumstances.

According to at least one embodiment, the cam 510 is preferably designed to roll against a borehole wall by a pulling force (e.g., from the surface) exerted upon the VSI shuttle. Additionally, the rotation of the cam is caused by the friction between the surface of the cam and the surface of the borehole wall. The rotational force exerted on the cam may depend at least in part upon on the friction coefficient of the cam material and borehole wall surface material.

In at least one implementation, a temporary stop mechanism may be employed to prevent rotation of the cam 510 during normal seismic logging operations. For example, as illustrated in the embodiments of FIGS. 5D-F, spring 506, hook 505 and connector pin 509 may be utilized to prevent cam 510 from rotating until a desired threshold amount of force has been exerted upon cam 510 sufficient to cause cam 510 to change the direction of the rotational torque (Ms) Thus, for example, as illustrated in FIG. 5E, the spring force (Fs) from spring 506 and the relative alignment of pivot pins 504, 509 and 512 causes a rotational torque (Ms) to be exerted on the cam 510 in a counterclockwise direction, which causes the cam 510 to be positioned in its "normal" position (e.g., during normal operations).

According to a specific embodiment, when a given amount of force is exerted upon the cam 510 (such as, for example, when an upward pulling force is exerted upon an anchored shuttle in a borehole), the cam 510 will begin to rotate in a clockwise direction, which changes the relative alignment of pivot pins 504, 509 and 512. When the rotation of the cam exceeds the "dead point" (i.e., the point at which all pivot pins 504, 509 and 512 are aligned in a substantially straight line), the rotational torque (Ms) caused by the spring force (Fs) changes direction to thereby cause the cam 510 to rotate into its "fully extended" position, as illustrated, for example, in FIG. 5F of the drawings. It will be appreciated that this change in the direction of the rotational torque facilitates the cam in further rotational movement, and helps to prevent the cam 510 from slipping against the borehole wall surface.

According to a specific implementation, the cam 510 may be designed to rotate in a substantially elliptical manner such that its radius increases as it rotates. In at least one implementation, the amount of rotation permitted for cam 510 may be limited in order to prevent over rotation of the cam in a direction which will cause its radius to decrease. As the cam 510 begins to rotate (e.g., in a clockwise direction) from its normal or rest position (as shown, for example, in FIG. 5E), the anchor arm 501 will begin being displaced away from the borehole wall by a distance which may be represented as AD. The value of AD may increase as the cam is rotated, for example, from its normal position (e.g., FIG. 5E) to its fully extended position (e.g., FIG. 5F). It will be appreciated that the threshold breaking force necessary for causing the breaking of the anchor arm weakpoint mechanism may be dependent upon both the actuation force (anchoring force) and the force exerted upon the anchor arm by the AD movement of the anchor arm as caused by the cam rotation. Accordingly, taking into account all the different forces contributing to the threshold breaking force, in at least one embodiment the anchor arm weakpoint mechanism may be configured or designed to break well before the full extension of the cam is reached. In specific embodiments where a connector pin is used as the anchor arm weakpoint mechanism (as described, for example, in FIGS. 6B and 6C), the threshold breaking force necessary for causing the breaking of the connector pin may be related to its shear strength.

Figure 5D:
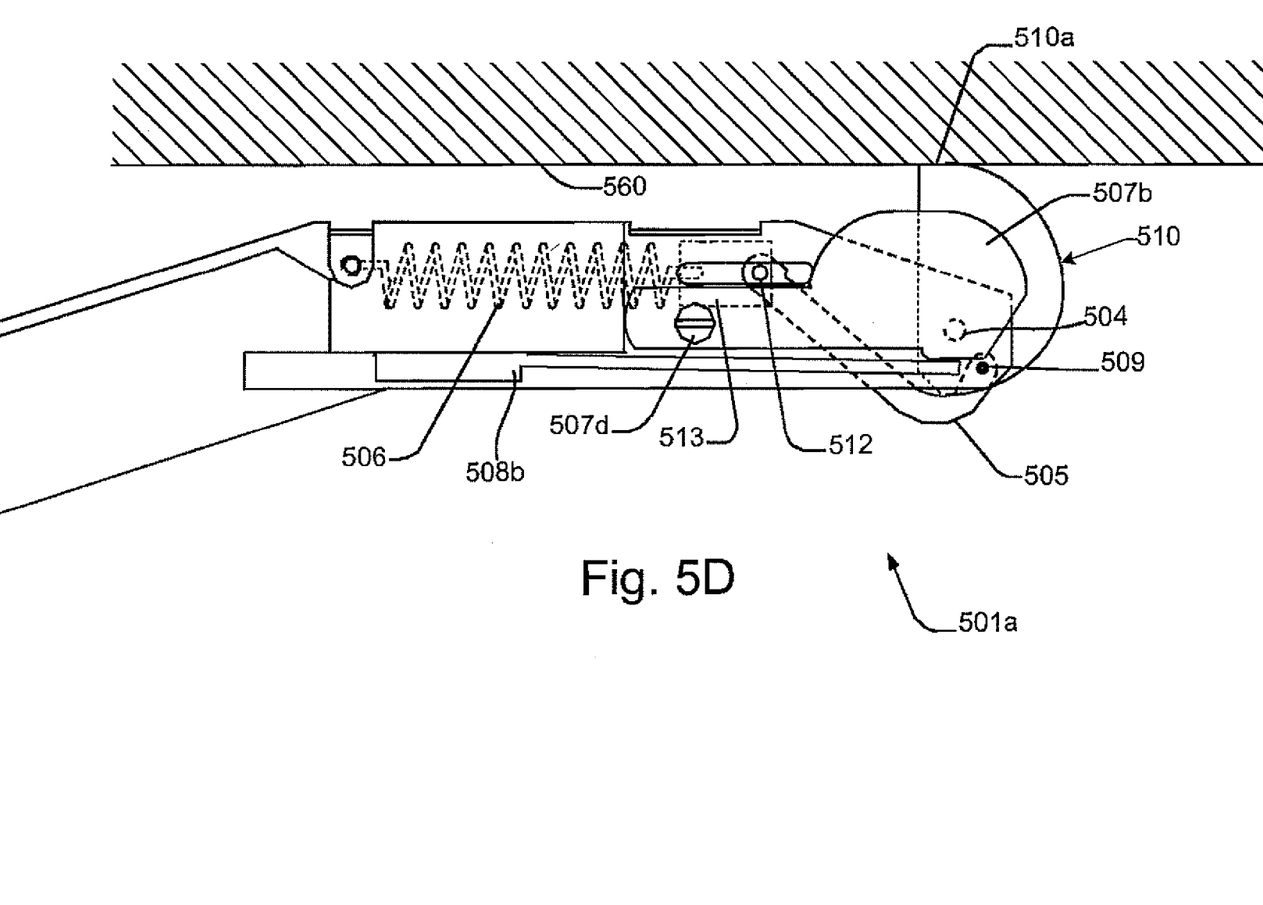
Figure 5E:
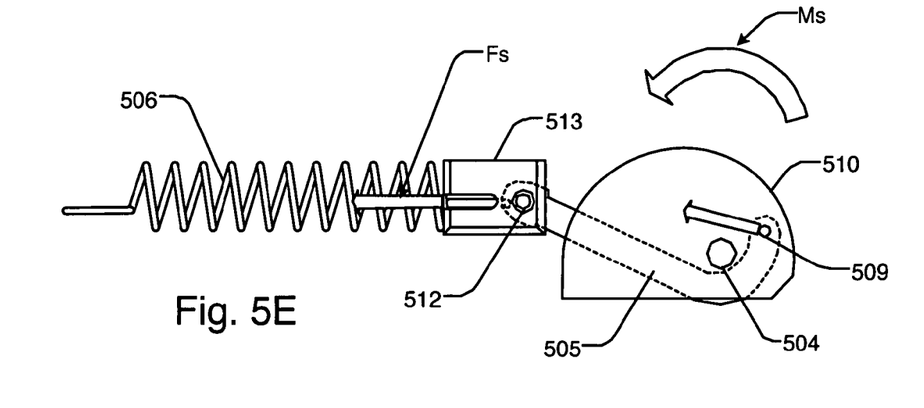
Figure 5F:
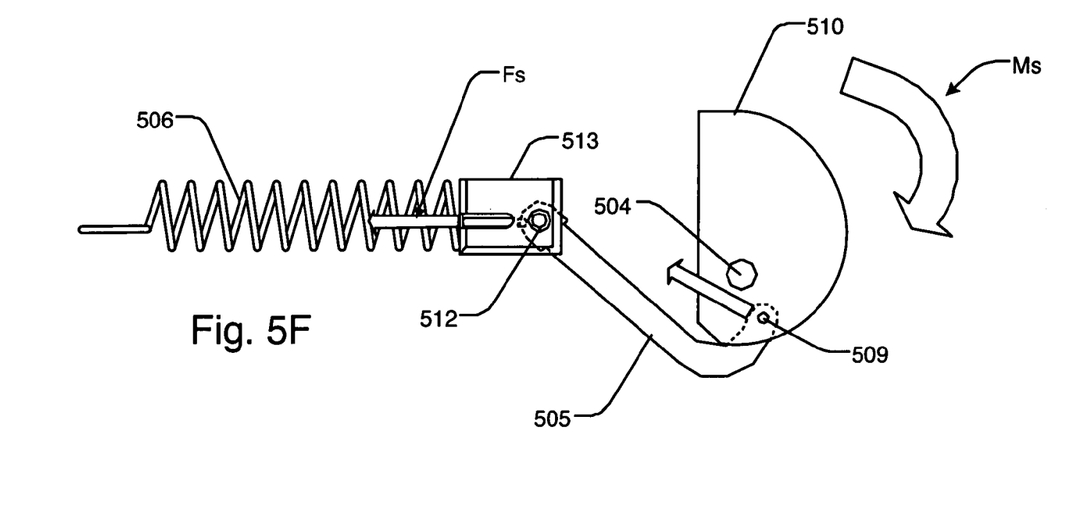

FIG. 5D shows a side view illustrating how end portion 501*a* of the modified anchor arm may engage borehole wall, in accordance with a specific embodiment of the present invention. In its fully extended position (as shown, for example, in FIG. 5D), edge portion 510*a* of the cam 510 engages the borehole wall surface 560. It will be appreciated that the embodiment of FIG. 5D represents an extreme case where the cam 510 has been rotated into a maximum extension position. According to at least one embodiment, however, the anchor arm weakpoint mechanism may be configured or designed to fail or break at some intermediated point which occurs after the cam 510 has begun rotating, but before the cam 510 has reached its maximum extension position. According to different embodiments, the different sized cams may be configured or designed to provide a range of ΔD values which, for example, may range from may range from 3-30 mm (as measured, for example, from the cam's normal position to its fully extended position). In some implementations, a ΔD range of 8-13 mm has been found to be appropriate, and in at least one application a cam providing a ΔD range of 11 mm has been found to be appropriate. It is noted that the additional force on anchor arm 501 created by the rotation of cam 510 is a mechanically more efficient way to exert leverage on the anchor arm linkage weakpoint, as compared to conventional anchor arm designs.

It will be appreciated that different implementations of the cam design may be used in the modified anchor arm technique of the present invention, depending upon a variety of factors such as, for example, borehole diameter, anchor arm length, anchor arm design, anchor arm strength, cam hardness, cam surface, frictional force characteristics of the borehole wall. For example, as illustrated in FIG. 5D, the design of cam 510 is asymmetrical, and may include a combination of flat edges and/or curved edges.

Figure 7:
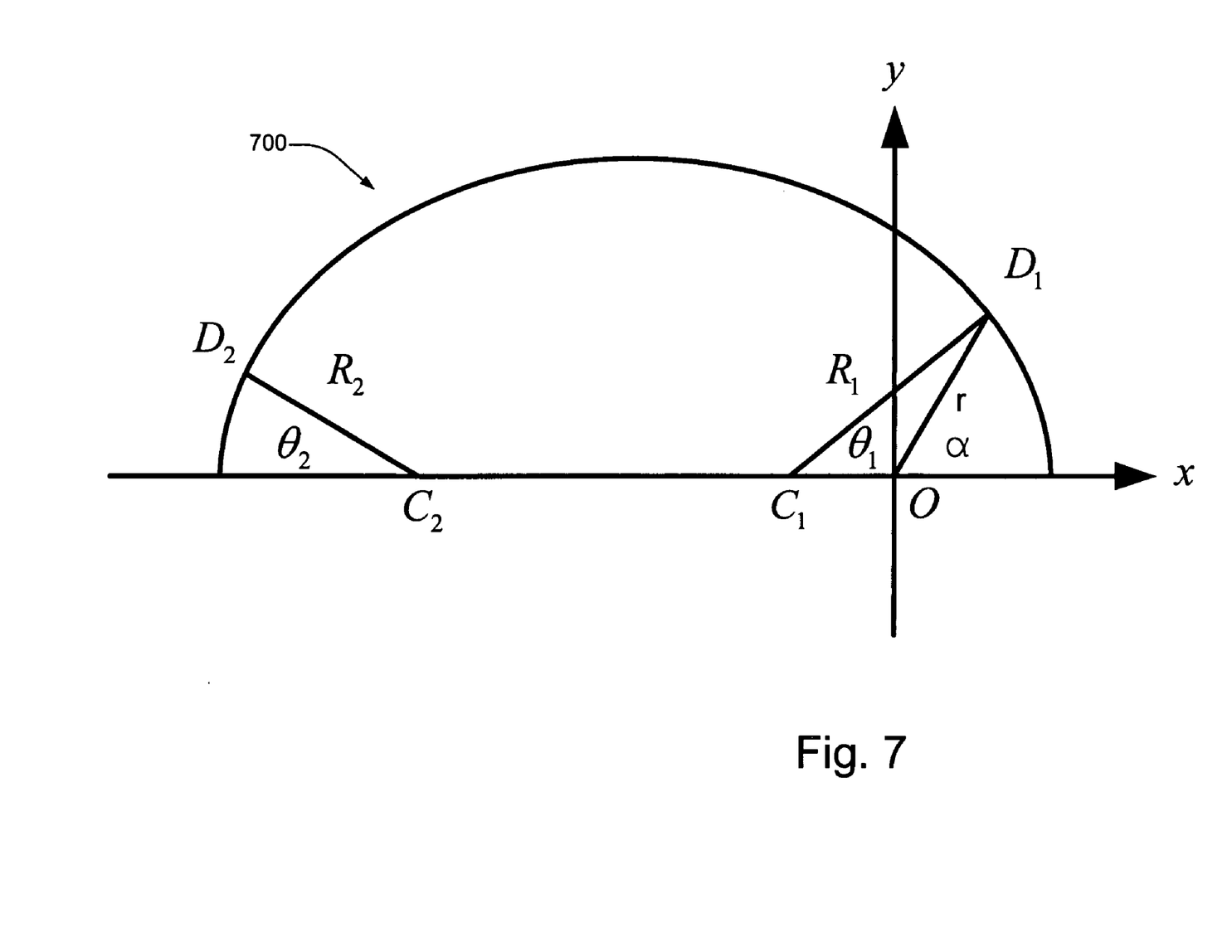
FIG. 7 shows various design features of a cam design in accordance with a specific embodiment of the present invention.

An additional design consideration of the cam relates to the rate of increase in the cam's radius as a function of its angular rotation. This concept is illustrated in FIG. 7 of the drawings. As illustrated in FIG. 7, the radius (r) of cam portion 700 may vary as a function of angular rotation (α) as the cam is rotated about the point represented at O. According to one implementation, the cam may be designed to conform to the following criteria:

O: center of cam;
$C_1$: center of beginning circular arc,
$C_2$: center of ending circular arc, $$\alpha_{D_1} = \frac{\pi}{4},$$

the angel of $D_1$, $$\alpha_{D_2} = \frac{19\pi}{20},$$

the angel of $D_2$, $$\text{for: } \frac{\pi}{4} < \alpha < \frac{19\pi}{20},$$
$$r(\alpha) = 11\exp\left(0.2\left(\alpha - \frac{\pi}{4}\right)\right),$$

$x_{D_1} = 11e^{0.2(\alpha D1 - \pi/4)} \cos(\alpha_{D_1})$ $y_{D_1} = 11e^{0.2(\alpha D1 - \pi/4)} \sin(\alpha_{D_1})$ $x_{D_2} = 11e^{0.2(\alpha D2 - \pi/4)} \cos(\alpha_{D_2})$ $y_{D_2} = 11e^{0.2(\alpha D2 - \pi/4)} \sin(\alpha_{D_2})$ According to a specific embodiment, the lines $C_1D_1$ and $C_2D_2$ are perpendicular to the cam profile. In this embodiment, their inclinations may be calculated as follows:

$$m_{D_1,D_2} = -\frac{0.2\cos\alpha - \sin\alpha}{0.2\sin\alpha + \cos\alpha}\bigg|_{\alpha=\alpha_{D_1},\alpha_{D_2}}$$

As illustrated in FIG. 7, the lines with the above inclinations, which pass through $D_1$ and $D_2$, cross the x-axis at $C_1$ and $C_2$ respectively. As a result we obtain:

$x_{C_1} = x_{D_1} - y_{D_1}/m_{D_1} = -3.889087$ $x_{C_2} = x_{D_2} - y_{D_2}/m_{D_2} = -9.648644$

And we will have:

$R_1 = |C_1D_1| = 14.022304$ $R_2 = |C_2D_2| = 7.696361$ $\theta_1 = \arcsin(y_{D_1}/R_1) = 0.588003$ rad $\theta_2 = \arcsin(y_{D_2}/R_2) = 0.354475$ rad Additionally, according to a specific embodiment, the coordinates of the points on beginning and ending circular arcs are obtained as follows:

The points on the beginning arc $(0 < \theta_b < \theta_1)$:

$x = R_1 \cos\theta_b + x_{C_1} = 14.022304 \cos\theta_b - 3.889087$ $y = R_1 \sin\theta_b = 14.022304 \sin\theta_b$ The points on the ending arc $(0 < \theta_e < \theta_2)$:

$x = -R_2 \cos\theta_e + x_{C_2} = -7.696361 \cos\theta_e - 9.648644$ $y = R_2 \sin\theta_e = 7.696361 \sin\theta_e$ Other considerations for the modified anchor arm (which may include aspects of the inventive cam design) may include one or more of the following criteria:

the modified anchor arm design may be configured or designed to be compatible with conventional seismic logging tools;

the modified anchor arm design may be configured or designed to be compatible with conventional seismic logging techniques;

the modified anchor arm design may be configured or designed to be compatible with conventional seismic tool rescue techniques;

the modified anchor arm design may be configured or designed to be easily adapted to interface with conventional seismic logging tools;

the modified anchor arm design may be configured or designed to create suitable anchoring forces for conventional seismic logging operations;

the modified anchor arm design may be configured or designed to minimize the time required for breaking the anchor arm linkage weakpoint;

the modified anchor arm design may be configured or designed to not affect the acoustic characteristics of the seismic logging tool;

the modified anchor arm design may be configured or designed to not significantly affect the diameter and/or weight of the seismic logging tool;

the modified anchor arm design may be configured or designed to help protect the cam from external environmental factors.

Additionally, other design features may be incorporated into the cam design, for example, in order to prolong the operational life of the cam. Such design features may include, for example, using relatively hard materials to form the cam in order to prevent premature wear; modifying the cam surface with texturing in order to improve the frictional contact with the borehole wall; modifying the shape of the cam surface (e.g., using a convex shape or a concave shape) to improve and/or maintain frictional contact with the borehole wall, etc.

It will be appreciated that, in alternate embodiments of the present invention (not shown), conventional VSI shuttle anchor arms may be modified to include the cam mechanism described herein. Such modifications will generally be known to one having ordinary skill in the art.

Other Embodiments of the Anchor Arm Weakpoint Linkage

It will be appreciated that there are a variety of different implementations of the anchor arm linkage weakpoint mechanism which may be used in the VSI shuttle of the present invention. For example, one alternate embodiment of the anchor arm linkage weakpoint mechanism is illustrated in FIG. 6B of the drawings.

Figure 6B:
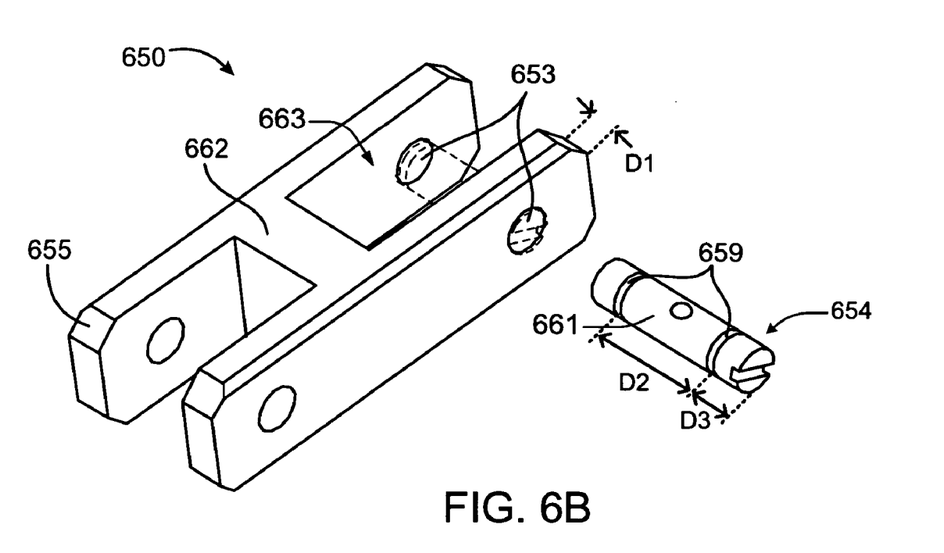
FIG. 6B-C show perspective views of different embodiments of anchor arm linkage weakpoint mechanisms of the present invention.

FIG. 6B shows a perspective view of an alternate embodiment of an anchor arm linkage weakpoint mechanism in accordance with a specific embodiment of the present invention. As illustrated in FIG. 6B, anchor arm linkage 650 includes linkage body portion 662, and at least one connector pin 654. For purposes of simplification, other components of the anchor arm linkage are not shown. In the embodiment of FIG. 6B, the weakpoint mechanism of the anchor arm linkage is incorporated into the connector pin 654 (rather than the linkage body as shown in FIG. 6A) which is used to secure the anchor arm (not shown) to the anchor arm linkage. More specifically, according to one implementation, weakpoints 659 are incorporated into connector pin 654 to allow the connector pin to break (at the weakpoints 659) when a specified amount of force is exerted upon the connector pin. According to different embodiments, implementation of weakpoints 659 may be achieved, for example by using weaker material at weakpoints 659; by removing connector pin material at weakpoints 659; and/or by other structural weakening techniques. According to a specific implementation, the modified connector pin 654 may be designed such that the positions of weakpoints 659 are located within the inner linkage cavity 663 when the connector pin is inserted thru apertures 653 (as shown in phantom in FIG. 6B). Thus, for example, in the implementation of FIG. 6B, the distance D3 (which represents the position of weakpoint 659 relative to the end of the connector pin) is preferably greater than distance D1 (which represents the thickness of the link body portion). Additionally, according to a specific embodiment, the distance D2 (which represents the distance between the two weakpoints) is preferably greater than the width of the anchor arm end which connects to the anchor arm linkage.

Figure 6C:
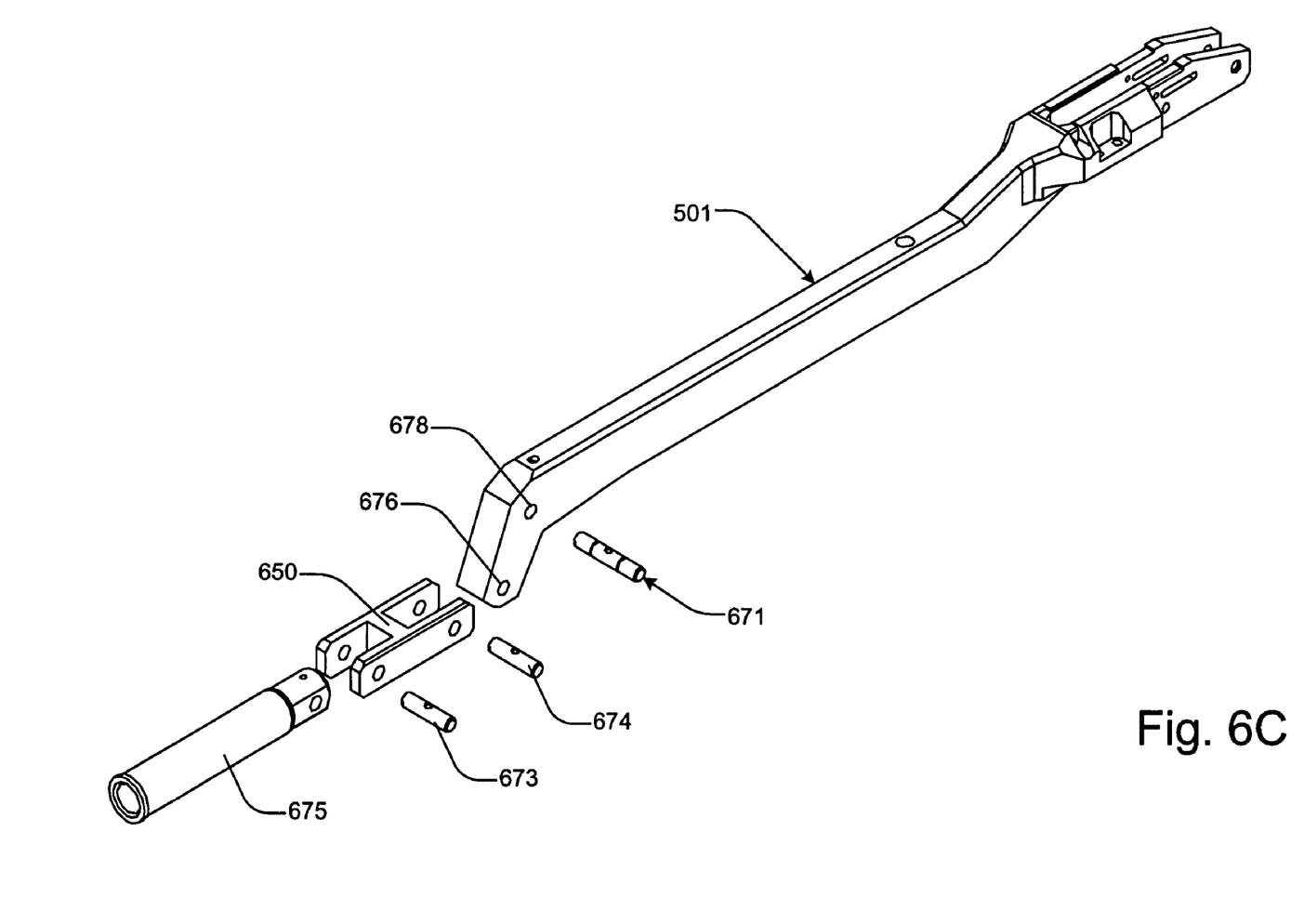

FIG. 6C shows a perspective view of how the weakpoint mechanism of the present invention may be used in conjunction with anchor arm 501, in accordance with a specific embodiment of the present invention. As illustrated in FIG. 6C, anchor arm may include two pivot points 676 and 678. According to a specific embodiment, during deployment of the seismic logging tool in the field, pivot point 676 is connected to linkage 650 using connector pin 674. The other pivot point 658 is connected to the body or housing of the tool (not shown) using connector pin 671. According to different implementations, a modified connector pin which includes the weakpoint mechanism of the present invention (as described, for example, in FIG. 6B) may be utilized for connector pin 671, and/or may be utilized for connector pin 674, and/or may be utilized for connector pin 673. As illustrated in FIG. 6C, the modified connector pin which includes the weakpoint mechanism of the present invention is utilized only for connector pin 671 (and not for connector pins 673 and 674) because connector pin 671 is easier to service and/or replace when broken than connector pins 673 and 674.

It will be appreciated that the anchor arm linkage weakpoint mechanism implementations of FIGS. 6B and 6C provide a number of advantages over other anchor arm linkage weakpoint mechanism designs such as that shown in FIG. 6A. For example, the modified connector pin of the present invention which includes the weakpoint mechanism of the present invention is simpler in design and therefore less costly to manufacture. Additionally, replacement of the weakpoint mechanism of the present invention (e.g., modified connector pin 654 with integrated weakpoints) is less expensive than replacement of the weakpoint mechanism of FIG. 6A (i.e., anchor arm link body 612). Also, replacement of a broken connector pin may be performed more quickly than replacement of the anchor arm linkage.

According to different embodiments, the anchor arm linkage weakpoint mechanism characteristics may vary with borehole diameter. For example, the characteristics of the anchor arm linkage weakpoint mechanism may be designed to take into account that it may be more difficult to break the anchor arm linkage weakpoints in relatively smaller diameter boreholes. Additionally, as stated previously, the characteristics of the anchor arm linkage weakpoint mechanism may also depend upon the amount of frictional force being created at the contact between the anchor arm tip and the borehole wall. The characteristics of the anchor arm linkage weakpoint mechanism may also depend upon characteristics of other complements of the multi-shuttle seismic array. For example, according to at least one implementation, the force required to break the anchor arm linkage weakpoint mechanism preferably does not exceed the force required for breaking of the VSI interconnect cable.

INDUSTRIAL APPLICABILITY

The present invention finds application in the field of borehole logging tools, particularly seismic multi-shuttle logging tools which can be used to evaluate the formations surrounding boreholes such as are drilled for the extraction of hydrocarbons or geothermal energy.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. An anchoring arm for use with a borehole seismic acquisition tool, the borehole seismic acquisition tool including a tool body, the anchoring arm comprising:
    a first end adapted for contacting a borehole wall surface;
    a movable cam;
    wherein the cam is removably secured to said first end via a first connector pin; and
    wherein the cam is at least partially rotatable about the first connector pin and is configured and arranged to rotate against the borehole wall by a pulling force at a top portion of the borehole seismic acquisition tool.

2. The anchoring arm of claim 1 wherein the first end is adapted to present a surface of the cam, for contacting the borehole wall surface.

3. The anchoring arm of claim 1,
    wherein the first end is adapted to engage the cam against a portion of the borehole wall surface;
    wherein the first end is further adapted to allow the cam to rotate in a substantially elliptical motion about the first connector pin; and
    wherein the rotation of the cam against the borehole wall surface causes a first force to be exerted upon the first end.

4. The anchoring arm of claim 3 wherein a direction of said first force is substantially perpendicular to the borehole wall surface.

5. The anchoring arm of claim 1,
    wherein the first end is adapted to engage the cam against a portion of the borehole wall surface;
    wherein the first end is farther adapted to allow the cam to rotate in a substantially elliptical motion about the first connector pin; and
    wherein the rotation of the cam against the borehole wall surface causes a displacement of the first end in a direction away from the borehole wall surface.

6. The anchoring arm of claim 1 wherein a radius of the cam increases as the cam is rotated about the first connector pin.

7. The anchoring arm of claim 1 further comprising a temporary stop mechanism configured or designed to prevent rotation of the cam until a specified threshold amount of force has been exerted upon cam.

8. The anchoring arm of claim 1 wherein a radius R of the cam increases as the cam is rotated about the first connector pin; and
wherein the cam radius R may be expressed as a function of an amount of angular rotation α of the cam, according to:

$$r(\alpha) = 11\exp\left(0.2\left(\alpha - \frac{\pi}{4}\right)\right),$$

where $$\frac{\pi}{4} < \alpha < \frac{19\pi}{20}.$$

9. The anchoring arm of claim 1 wherein the cam has an asymmetrical shape.

10. The anchoring arm of claim 1 further comprising a permanent stopping mechanism adapted to prevent the cam from rotating more than a desired amount.

11. The anchoring arm of claim 10 wherein said desired amount is about 90 degrees.

12. The anchoring arm of claim 1 wherein the first end includes a tip portion having a slot defined therein, the movable cam being inserted into said slot, the cam including a first aperture, said first connector pin being insertable through said first aperture.

13. A borehole seismic acquisition tool comprising:
a tool body having at least one sensor package;
an anchoring arm; and
anchoring arm linkage adapted to connect the anchoring arm to the tool body;
the anchoring arm comprising a first end and a second end, the second end being pivotally attached to the anchoring arm linkage, the first end being adapted for contacting a borehole wall surface;
the anchoring arm further comprising a movable cam;
wherein the cam is removably secured to said first end via a first connector pin;
wherein the cam is at least partially rotatable about the first connector pin and is configured and arranged to rotate against the borehole wall by a pulling force at a top portion of the borehole seismic acquisition tool.

14. The borehole seismic acquisition tool of claim 13 wherein the anchoring arm linkage includes a weakpoint mechanism adapted to break in response to a minimum threshold amount of breaking force being applied to said weakpoint mechanism.

15. The borehole seismic acquisition tool of claim 14 wherein the first end of the anchoring arm is adapted to engage the cam against a portion of the borehole wall surface;
wherein the first end is further adapted to allow the cam to rotate in a substantially elliptical motion about the first connector pin; and
wherein the rotation of the cam against the borehole wall surface causes a first force to be exerted upon the weakpoint mechanism.

16. The borehole seismic acquisition tool of claim 15 wherein said first force is at least equal to the minimum threshold amount of breaking force.

17. The borehole seismic acquisition tool of claim 14, wherein the first end is adapted to engage the earn against a portion of the borehole wall surface;
wherein the first end is further adapted to allow the cam to rotate in a substantially elliptical motion about the first connector pin; and
wherein the rotation of the cam against the borehole wall surface causes a displacement of the first end away from the borehole wall surface.

18. The borehole seismic acquisition tool of claim 17 wherein the displacement of the first end of the anchoring arm causes a first force to be exerted upon the weakpoint mechanism; and
wherein said first force is at least equal to the minimum threshold amount of breaking force.

19. The borehole seismic acquisition tool of claim 13 wherein a radius of the cam increases as the cam is rotated about the first connector pin.

20. The borehole seismic acquisition tool of claim 14 wherein the weakpoint mechanism is located at or near a second connector pin in the anchoring arm linkage.

21. The borehole seismic acquisition tool of claim 13 wherein the first end includes a tip portion having a slot defined therein, the movable cam being inserted into said slot, the cam including a first aperture, said first connector pin being insertable through said first aperture.

22. A method for releasing a borehole seismic acquisition tool from a stuck position within a borehole, the borehole seismic acquisition tool comprising a tool body having at least one sensor package, the borehole seismic acquisition tool further comprising an anchoring arm, the borehole seismic acquisition tool further comprising an anchoring arm linkage adapted to connect the anchoring arm to the tool body, the anchoring arm linkage including a weakpoint mechanism adapted to break in response to a minimum threshold amount of breaking force being applied upon the weakpoint mechanism, the anchoring arm comprising a first end and a second end, the second end being pivotally attached to the anchoring arm linkage, the anchoring arm further comprising a movable cam, the cam being removably secured to said first end via a first connector pin, the cam is being least partially rotatable about the first connector pin, wherein an exposed portion of the cam is engaged with a surface of a wall of the borehole, the method comprising:
detecting a failure of retraction of the anchoring arm;
causing the cam to rotate against the borehole wall surface in response to detection of the failure of retraction of the anchoring arm;
applying a pulling force at a top portion of the borehole seismic acquisition tool;
wherein the rotation of the cam against the borehole wall surface causes a first force to be exerted upon the weakpoint mechanism; and
causing the weakpoint mechanism to break;
wherein the breaking of the weakpoint mechanism is due at least in part to the rotation of the cam against the borehole wall surface;
wherein said pulling force causes the rotation of the cam against the borehole wall surface.

23. The method of claim 22 wherein the breaking of the weakpoint mechanism results in a release of the borehole seismic acquisition tool from the stuck position.

24. The method of claim 22 wherein rotation of the cam is caused by a combination of the pulling force and friction between the cam and the borehole wall surface.

25. The method of claim 22 further comprising rotating the cam in a substantially elliptical motion about the first connector pin.

26. The method of claim 22 wherein the rotation of the cam against the borehole wall surface causes a displacement of the first end of the anchoring arm away from the borehole wall surface to thereby cause the first force to be exerted upon the weakpoint mechanism.

27. The method of claim 22 wherein the weakpoint mechanism is located at the first connector pin, the method further comprising causing the connector pin to break in response to rotation of the cam against the borehole wall surface.

28. The method of claim 22 wherein the first end includes a tip portion having a slot defined therein, the movable cam being inserted into said slot, the cam including a first aperture, said first connector pin being insertable through said first aperture.

* * * * *